United States Patent [19]

Schluenz et al.

[11] Patent Number: 5,504,152
[45] Date of Patent: Apr. 2, 1996

[54] ESTERIFICATION OF ROSIN

[75] Inventors: Robert W. Schluenz, Panama City; Paul S. Douglas, Gulf Breeze, both of Fla.

[73] Assignee: Arizona Chemical Company, Panama City, Fla.

[21] Appl. No.: 370,733

[22] Filed: Jan. 10, 1995

[51] Int. Cl.$^6$ .................................................. C09F 1/04
[52] U.S. Cl. ................ 525/54.4; 525/167.5; 527/601; 530/211
[58] Field of Search ................ 525/54.4, 167.5; 527/601; 530/211, 212

[56]  References Cited

U.S. PATENT DOCUMENTS

| | | |
|---|---|---|
| 2,197,855 | 4/1940 | Ellis . |
| 2,441,197 | 5/1948 | Kalman et al. ............ 530/209 |
| 4,548,746 | 10/1985 | Duncan et al. . |
| 4,643,848 | 2/1987 | Thomas et al. . |
| 4,650,607 | 3/1987 | Lampo et al. . |
| 4,657,703 | 4/1987 | Durkee ..................... 530/218 |
| 4,657,706 | 4/1987 | Durkee ..................... 530/218 |
| 4,659,514 | 4/1987 | Beuke . |
| 4,670,504 | 6/1987 | Cardenas et al. .......... 524/504 |
| 4,690,783 | 9/1987 | Johnson, Jr. ............... 530/213 |
| 4,693,847 | 9/1987 | Johnson, Jr. . |
| 4,725,384 | 2/1988 | Du Vernet . |
| 4,744,925 | 5/1988 | Lampo et al. . |
| 4,758,379 | 7/1988 | Johnson, Jr. ............... 530/218 |
| 4,788,009 | 11/1988 | Johnson, Jr. . |
| 4,962,186 | 10/1990 | Johnson, Jr. ............... 530/218 |
| 5,019,167 | 5/1991 | Johnson, Jr. et al. ....... 106/241 |
| 5,049,652 | 9/1991 | Minn ........................ 530/213 |
| 5,120,781 | 6/1992 | Johnson, Jr. ............... 524/274 |
| 5,162,496 | 11/1992 | Johnson, Jr. ............... 530/212 |
| 5,177,133 | 1/1993 | Peck et al. ................. 524/139 |

FOREIGN PATENT DOCUMENTS

WO84/04533  11/1984  WIPO .

*Primary Examiner*—Jeffrey Mullis
*Attorney, Agent, or Firm*—Luedeka, Neely & Graham

[57] ABSTRACT

The specification discloses a method for esterifying rosins with a polyol which comprises contacting rosin with the polyol in the presence of a bleaching mixture which includes both an alkaline earth hypophosphite and hypophosphorous acid and, preferably also, an organic sulfide, under esterification conditions to produce a rosin ester. The method enables production of rosin esters which have a color of less than about 5 Gardner neat. The preferred bleaching mixture includes from about 0.01% to about 0.10% of the alkaline earth hypophosphite and from about 0.10% to about 0.15% of active hypophosphorous acid, where the amounts are based on the weight of the rosin. The most preferred alkaline earth hypophosphite is calcium hypophosphite. The specification also describes a method for preparing an adhesive from the rosin ester.

34 Claims, No Drawings

ESTERIFICATION OF ROSIN

FIELD OF THE INVENTION

The present invention relates to methods for preparing esters of rosin and more particularly relates to the preparation of polyol esters of tall oil rosin.

BACKGROUND OF THE INVENTION

Rosin is derived from pine trees, chiefly *Pinus palustris* and *Pinus caribaea*. Gum rosin is the residue obtained after the distillation of turpentine oil from the oleoresin tapped from living trees. Wood rosin is obtained by extracting pine stumps with naphtha and distilling off the volatile fraction. Tall oil rosin is a co-product of the fractionation of tall oil. The chief constituents of rosin are the resin acids of the abietic and pimaric types, having the general formula $C_{19}H_{29}COOH$ and having a phenanthrene nucleus.

The esterification of rosin is well known in the art. Such esterified rosin products are used extensively for preparing adhesives, coatings, ink varnishes and other materials.

Rosins are generally esterified by the thermal reaction of the rosin with an alcohol such as a polyol. A polyol in widespread use today is pentaerythritol, with four active hydroxyl groups. Tall oil rosin is widely used as a source of rosin for its availability and low cost.

The rosin ester market of today requires lighter colored products than are currently available. The known methods to produce lighter colored rosins are expensive since they result in rosin quality improvements at the expense of rosin yield. Such methods include the use of solid adsorbents such as carbon, esterifications in solvent, or the use of hydrogenation of the ester. Each of these techniques, while producing rosin esters with desirable characteristics, are time consuming and add unacceptable cost of the final product.

It is known to use small amounts of calcium hypophosphite to catalyze the reaction of a rosin with a polyol to form the ester. This reaction produces esters with colors in the range of 5+ on the Gardner scale. Such an ester is an improvement over the 6− on the Gardner scale produced by the esterification of the rosin without the calcium hypophosphite.

It is also known to use hypophosphorous acid to catalyze the rosin esterification reaction to produce lighter esters. Like the calcium hypophosphite catalyst, the hypophosphorous acid produces rosin esters with a color improvement of about one-half a number on the Gardner scale. The one-half number improvement is about the maximum improvement seen with either calcium hypophosphite or hypophosphorous acid.

Despite the above improvements, there is a growing demand for still lighter rosin esters. The lightening of a rosin ester by as little as an additional one-half a Gardner color number (that is, to a color of 5− or less) is highly desired in the marketplace. Such rosin esters would be used to prepare a variety of more desirable, lighter colored adhesives.

It is, therefore, an object of the present invention to provide a new method for the production of rosin esters which would yield rosin esters having colors lighter than about 5 on the Gardner scale.

It is another object of the present invention to provide such a process which produces rosin esters suitable for use in adhesives.

It is a further object of the invention to provide rosin esters which have Gardner colors of about one number less than the rosin esters prepared without additives.

SUMMARY OF THE INVENTION

Having regard to the above and other objects and advantages, the present invention is directed to a method for esterifying rosin which comprises contacting rosin and a polyol, such as pentaerythritol, with a bleaching mixture including an alkaline earth hypophosphite and active hypophosphorous acid to form a reaction mix. The mix is heated until an acid number in the range of from about 16 to about 14 is reached followed by a stripping treatment using a stream of inert gas, such as steam, carbon dioxide or nitrogen at a pressure in the range of from about 100 mm Hg to about 400 mm Hg and at a temperature in the range of from about 200° C. to about 300° C. until an acid number in the range of from about 12 to about 8 is reached to provide a rosin ester in the reaction mix. The stripping treatment also removes unwanted oils from the reaction mix. The method enables the production of an esterified rosin which has a color of less than about 5 Gardner neat.

Preferably, the amount of polyol in the starting material is from about 10% to about 13%, based on the weight of the rosin. It is also preferred to use from about 0.01% to about 0.10% of the alkaline earth hypophosphite and from about 0.10% to about 0.15% of active hypophosphorous acid, also based on the weight of the rosin. The most preferred alkaline earth hypophosphite is calcium hypophosphite.

In a preferred embodiment of the invention, the polyol is selected from the group consisting of pentaerythritol glycerol, trimethanol propane, ethylene glycol, propylene glycol, diethylene glycol, dipropylene glycol, triethylene glycol, tripropylene glycol, polyethylene glycol, and polypropylene glycol. The most preferred polyol is pentaerythritol.

The reaction mix preferably further includes an organic sulfide bleaching agent, preferably in a concentration of from about 0.25% to about 0.35% based on the weight of the rosin. The phenol sulfide bleaching agent is preferably selected from the group consisting of isopropyl mercaptan, thiophenol, thiosalicylic acid, 2,6-tert-butylphenol-4-thiol, phenyldisulfide, nonylphenol disulfide oligomer, di-(3,5-tert-butylphen-3-ol)disulifide, thiobis-β-naphthol, tetramethylthiuram disulfide, a mixture of 3,5-tert-butylphen-3-olsulfide, di-(3,5 -tert-butylphen-3-ol)disulfide, di-(3,5-tert-butylphen-3-ol)trisulfide, and di-(3,5-tert-butylphen-3-ol)tetrasulfide, and mixtures of thereof.

The present invention is also directed to a resin prepared according to the present method.

In addition, the present invention provides a method for preparing an adhesive. The method comprises preparing a resin as described herein above and then adding the resin to an elastomer. The method affords an opportunity to provide an adhesive which is light in color and has other desirable characteristics. A preferred elastomer is selected from the group consisting of styrene-butadiene-styrene copolymers, ethylene vinyl acetate copolymers, styrene-ethylene/butylene-styrene copolymers and styrene-isoprene-styrene copolymers.

DETAILED DESCRIPTION OF THE INVENTION

In the practice of a preferred embodiment of the present invention, tall oil rosin is combined with a polyol such as pentaerythritol in the presence of a bleaching mixture which includes both an alkaline earth hypophosphite and hypophosporous acid. The two agents (hypophosphite and hypophosporous acid) are believed to act synergistically to further improve the color of rosin esters. That is, the use of an alkaline earth hypophosphite together with hypophosphorous acid in the esterification of a rosin with a polyol produces an ester which has a better color than an ester produced from the same rosin and polyol with the hypophosphite or acid alone, or without either. For example, an esterified rosin has a color of about 6– on the Gardner scale when prepared without either hypophosphite or hypophosphorous acid. The same esterified rosin prepared with the hypophosphite alone has a color improvement to a Gardner color of 5+, even with relatively high concentrations of the hypophosphite. The same esterified rosin prepared with hypophosphorous acid alone has a color of 5+. However, when produced in the presence of both the alkaline earth hypophosphite and the hypophosphorous acid, the same ester has a color of between 5– and 4– depending on the concentration of the bleaching agents. Thus, it is believed the two agents of the invention act in a unique and unexpected manner to provide a resin with a superior color.

The alkaline earth hypophosphite is preferably present in the reaction mixture at a concentration of from about 0.01% to about 0.10%, most preferably at about 0.05%. The hypophosphorous acid is preferably provided at a concentration of from about 0.10% to about 0.15%, where the percentage indicates active hypophosphorous acid. It is believed that about 0.10% acid provides the best results in combination with about 0.05% hypophosphite. Hypophosphorous acid is most often available at a 50% level of activity. The 50% active hypophosphorous acid would therefore be added at a concentration of from about 0.20% to about 0.30%. The weights of the components of the bleaching mixture are based on the weight of the rosin.

The most preferred alkaline earth hypophosphite is calcium hypophosphite. However, any of the alkaline earth hypophosphites show desirable activity along with the acid, although not at the level seen with calcium hypophosphite. In addition, calcium hypophosphite is preferred due its ready availability on the market and relatively low cost.

In addition to the bleaching mixture previously described, an organic sulfide bleaching agent may also be advantageously used. Organic sulfide bleaching agents, and particularly phenol sulfides, have been known in the art and are widely used to bleach rosin esters. The alkaline earth hypophosphite and hypophosphorous acid combination of the present invention does not interfere with the bleaching action of currently used organic sulfides but, rather, improves the overall color of the final product.

It is particularly preferred that the present invention be used in the esterification of tall oil rosin with pentaerythritol. The rosin ester thereby formed has a color of less than about 5– on the Gardner scale.

In the preparation of the rosin ester according to the invention, the starting materials (the rosin and polyol) along with the bleaching mixture are heated in a suitable vessel or processing apparatus until the reaction mix reaches an acid number in the range of from about 16 to about 14. The rosin and polyol are preferably added first, and heated and stirred to provide a fluid mixture, prior to addition of the other materials. Preferably, an organic sulfide is added with the hypophosphite and hydrophosphorous acid.

The temperature for the initial step may generally range from about 220° C. to about 300° C., with from about 240° C. to about 280° C. being preferred. Most preferably, the reactants are heated in the range of from about 260° C. to about 270° C. At temperatures in the range of less than about 220° C., the esterification reaction proceeds too slowly to be of commercial use. At temperatures in the range of greater than about 300° C. the large number of side reactions reduces the yield of the desired resin to below a commercially desirable level.

The heating of the mixture is preferably undertaken in an inert atmosphere such as through the use of a nitrogen or carbon dioxide purge in the vessel. The time required may range from about 6 hours to about 18 hours with 12 hours generally being sufficient.

Preferably, the reaction mix is then subjected to a stripping treatment at a pressure in the range of from about 100 mm Hg to about 400 mm Hg, at an elevated temperature in the range of from about 220° C. to about 300° C., using a stream of an inert gas such as nitrogen, carbon dioxide or steam. In addition to lowering the acid number of the rosin ester, the stripping step entrains and removes volatiles and oils from the reaction mix. The stripping treatment is continued until an acid number in the range of from about 12 to about 8 is reached with a ring and ball softening point in the range of from about 100° C. to about 140° C. The esterified rosin is then recovered in a conventional manner such as by distilling any remaining volatile materials from the resin.

The resin of the present invention may be advantageously used to prepare an adhesive by combining the resin with an elastomer selected from the group consisting of styrene-butadiene-styrene copolymers, ethylene vinyl acetate copolymers, styrene-ethylene/butylene-styrene copolymers and styrene-isoprene-styrene copolymers. Examples of such polymers include ELVAX® 250 (Du Pont), KRATON® 1102 (Shell), KRATON® D1107 (Shell), KRATON® G1652 (Shell), STEREON® 840 (Firestone) and SOLPRENE®423 (Phillips Petroleum). The adhesive is prepared by techniques well known to practitioners in the art and will not be discussed in detail. The adhesive compounding can also include addition of oils (such as naphthenic oil) and antioxidants. The resulting adhesives show no detriment in adhesive properties as a result of the treatment of the rosin ester, and exhibit superior colors.

Of course, the improved rosin esters of the invention may find other end uses known or developed in the future for such materials such as coatings, sealants, and inks, for example.

The following nonlimiting examples further illustrate various aspects of the invention. Unless otherwise stated, all percentages are weight percentages based upon the weight of the rosin.

EXAMPLE I

A reaction vessel was charged with rosin and 11.4% pentaerythritol. The mixture was then heated to 200° C. under a nitrogen blanket, at which time a bleaching mixture consisting of 0.5% calcium hypophosphite, 0.25% of a 50% strength solution of active hypophosphorous acid, and 0.3% of a phenol sulfide bleaching agent (VULTAC 2) was charged to the reaction vessel. The reaction mix was then heated to 270° C. under a nitrogen purge until an acid number of about 14 was reached, requiring about 15 hours reaction time including a 2 hour heat-up time. The material was then subjected to a stripping treatment with nitrogen gas at 100 mmHg at 270° C. for about 1 hour to reduce the acid number to about 10, yielding an esterified rosin with a ring and ball softening point of about 100° C. The resulting rosin ester had color of 4 Gardner neat.

EXAMPLE II

A comparison rosin ester was produced without the use of the alkaline earth hypophosphite and the hypophosphorous acid together as in Example I. For this comparison, the reaction vessel was charged with the starting materials, rosin and 11.4% pentaerythritol. This mixture was then heated under a nitrogen blanket to 200° C., at which time a phenol sulfide bleaching agent (VULTAC 2) was charged to the reaction vessel. The resulting reaction mix was heated to 270° C. under a nitrogen purge for 15 hours, including a 2 hour heat uptime, until an acid number of 16 was reached. The reaction mix was then subjected to a stripping treatment with nitrogen 100 mm Hg at 270° C. for 1 hour to reduce the acid number to 10, yielding a rosin ester with a ring and ball softening point of 100° C. The ester had a color of 6 Gardner neat.

EXAMPLES III–IX

For additional comparisons a series of bleached rosins were produced with and without calcium hypophosphite and hypophosphorous acid. In these tests, the reaction vessel was charged with rosin and 11.4% pentaerythritol and then heated to 200° C. under a nitrogen blanket. Calcium hypophosphite, $Ca(H_2PO_2)_2$, and/or 50% active hypophosphorous acid, $H_3PO_2$, in the amounts shown in Table I below, along with 0.3% of a phenol sulfide bleaching agent (VULTAC 2) were then charged to the reaction vessel. The reaction mix was then heated under a nitrogen blanket to 270° C. until an acid number of about 16 was reached, requiring about 15 hours reaction time including a 2 hour heatup time. The reaction mix was then subjected to a stripping treatment with nitrogen gas at 100 mm Hg at 270° C. for 1 hour to further reduce the acid number to about 10. The resulting rosin esters had the gardner colors shown in Table I, below.

TABLE I

| Example | % $Ca(H_2PO_2)_2$ | % $H_3PO_2$ (50% Solution) | Color (Gardner, neat) |
| --- | --- | --- | --- |
| III | — | — | 6– |
| IV | — | 0.25 | 5+ |
| V | 0.10 | — | 5+ |
| VI | 0.05 | 0.25 | 5– |
| VII | 0.10 | 0.25 | 4+ |
| VIII | 0.50 | — | 5+ |
| IX | 0.50 | 0.25 | 4– |

Table I demonstrates that rosin esters produced using a mixture of calcium hypophosphite and hypophosphorous acid yield Gardner colors of about one number better than rosin esters prepared without the combination of the alkaline earth hypophosphite and the hypophosphorous acid. Table I also illustrates that increasing the calcium hypophosphite does not significantly improve the color of the product when hyphophorous acid is not used. However, increasing the calcium hypophosphite from 0.05 to 0.5% with the 0.25% hypophosphorous acid amount significantly improves the color from a 5– Gardner to a 4– Gardner.

EXAMPLE X

The rosin ester of Example I is heated to 175° C. under a nitrogen blanket. A styrene-isoprene-styrene copolymer (KATRON® 1107, Shell) is added with mixing to the rosin ester with naphthenic oil and an antioxidant. The relative percentage of the materials was as follows: rosin ester –33 wt %, polymer 49 wt %, oil - 16 wt % and antioxidant - 2 wt. %. The mixture is cooled and the adhesive is recovered. The shear strength and loop tack of the adhesive is substantially the same as an adhesive prepared in the same manner using the rosin ester of Example II.

Having thus described various preferred embodiments of the invention and several of its benefits and advantages, it will be understood by those of ordinary skill that the foregoing description is merely for the purpose of illustration and that numerous substitutions, rearrangements and modifications may be made in the invention without departing from the scope and spirit of the appended claims.

What is claimed is:

1. A method for making a rosin ester which comprises:
   contacting rosin and a polyol with a bleaching mixture which includes an alkaline earth hypophosphite and active hypophosphorous acid to form a reaction mix;
   heating the reaction mix at a temperature in the range of from about 220° C. to about 300° C. until an acid number in the range of from about 16 to about 14 is reached; and
   stripping the reaction mix in a stripping treatment with an inert gas at a pressure in the range of from about 100 mm Hg to about 400 mm Hg and a temperature in the range of from about 220° C. to about 300° C. until an acid number in the range of from about 12 to about 8 is reached to provide a rosin ester in the reaction mix.

2. The method of claim 1, wherein the polyol is selected from the group consisting of pentaerythritol, glycerol, trimethanol propane, ethylene glycol, propylene glycol, diethylene glycol, dipropylene glycol triethylene glycol tripropylene glycol polyethylene glycol, and polypropylene glycol.

3. The method of claim 2, wherein the polyol is pentaerythritol.

4. The method of claim 1, wherein there is in the range of from about 10% to about 13%, based on the weight of the rosin, of the polyol.

5. The method of claim 1, wherein the bleaching mixture includes from about 0.01% to about 0.10%, based on the weight of the rosin, of the alkaline earth hypophosphite and from about 0.10% to about 0.15%, based on the weight of the rosin, of active hypophosphorous acid.

6. The method of claim 5, wherein the alkaline earth hypophosphite is calcium hypophosphite.

7. The method of claim 1, wherein the reaction mix further includes an organic sulfide bleaching agent.

8. The method of claim 7, wherein the reaction mix includes from about 0.25% to about 0.35%, based on the weight of the rosin, of the organic sulfide bleaching agent.

9. The method of claim 8, wherein the organic sulfide bleaching agent is selected from the group consisting of isopropyl mercaptan, thiophenol, thiosalicylic acid, 2,6-tert-butylphenol-4-thiol, phenyldisulfide, nonylphenol disulfide oligomer, di-(3,5-tert-butylphen-3-ol)disulfide, thiobis-β-naphthol, tetramethylthiuram disulfide, a mixture of 3,5-tert-butylphen-3-olsulfide, di-(3,5-tert-butylphen-3-ol)disulfide, di-(3,5-tert-butylphen-3-ol)trisulfide, and di-(3,5-tert-butylphen-3-ol)tetrasulfide and mixtures of those organic sulfides.

10. The method of claim 1 wherein the heating of the reaction mix is at a temperature in the range of from about 240° C to about 280° C.

11. The method of claim 10 wherein the heating of the reaction mix is at a temperature in the range of from about 260° C. to about 270° C.

12. The method of claim 1 wherein the stripping treatment occurs at a temperature in the range of from about 240° C. to about 280° C.

13. The method of claim 12 wherein the stripping treatment occurs at a temperature in the range of from about 260° C. to about 270° C.

14. The method of claim 1 wherein the inert gas is selected from the group consisting of nitrogen, carbon dioxide and steam.

15. The method of claim 14 wherein the inert gas is nitrogen.

16. A rosin ester produced by the method of any of claims 1 through 15.

17. A method for preparing an adhesive comprising:

contacting rosin and a polyol with a bleaching mixture which includes an alkaline earth hypophosphite and active hypophosphorous acid to form a reaction mix;

heating the reaction mix at a temperature in the range of from about 220° C. to about 300° C. until an acid number in the range of from about 16 to about 14 is reached;

subjecting the reaction mix to a stripping treatment with an inert gas at a pressure in the range of from about 100 mm Hg to about 400 mm Hg and a temperature in the range of from about 220° C. to about 300° C. until an acid number in the range of from about 12 to about 8 is reached to provide a rosin ester in the reaction mix; and adding the rosin ester to an elastomer, thereby forming an adhesive.

18. The method of claim 16, wherein the polyol is selected from the group consisting of pentaerythritol, glycerol, trimethanol propane, ethylene glycol, propylene glycol, diethylene glycol, dipropylene glycol, triethylene glycol, tripropylene glycol, polyethylene glycol, and polypropylene glycol.

19. The method of claim 18 wherein the polyol is pentaerythritol.

20. The method of claim 17, wherein there is in the range of from about 10% to about 13%, based on the weight of the rosin, of the polyol.

21. The method of claim 17, wherein the reaction mix includes from about 0.01% to about 0.10%, based on the weight of the rosin, of the alkaline earth hypophosphite and from about 0.10% to about 0.15%, based on the weight of the rosin, of active hypophosphorous acid.

22. The method of claim 21, wherein the alkaline earth hypophosphite is calcium hypophosphite.

23. The method of claim 17, wherein the reaction mix further includes an organic sulfide bleaching agent.

24. The method of claim 23, wherein the reaction mix includes from about 0.25% to about 0.35%, based on the weight of the rosin, of the organic sulfide bleaching agent.

25. The method of claim 24, wherein the organic sulfide bleaching agent is selected from the group consisting of isopropyl mercaptan, thiophenol, thiosalicylic acid, 2,6-tert-butylphenol-4-thiol, phenyldisulfide, nonylphenol disulfide oligomer, di-(3,5-tert-butylphen-3-ol)disulfide, thiobis-β-naphthol, tetramethylthiuram disulfide, a mixture of 3,5-tert-butylphen-3-olsulfide, di-(3,5-tert-butylphen-3-ol)disulfide, di-(3,5-tert-butylphen-3-ol)trisulfide, and di-(3,5-tert-butylphen-3-ol)tetrasulfide and mixtures of those organic sulfides.

26. The method of claim 17 wherein the elastomer is selected from the group consisting of a styrene-butadiene-styrene copolymer, an ethylene vinyl aceteate copolymer, a styrene-ethylene/butylene-styrene copolymer, a styrene-isoprene-styrene copolymer, and mixtures of those copolymers.

27. The method of claim 26 wherein the elastomer is a styrene-butadiene-styrene copolymer.

28. The method of claim 17 wherein the heating of the reaction mix is at a temperature in the range of from about 240° C. to about 280° C.

29. The method of claim 28 wherein the heating of the reaction mix is at a temperature in the range of from about 260° C. to about 270° C.

30. The method of claim 17 wherein the stripping treatment occurs at a temperature in the range of from about 240° C. to about 280° C.

31. The method of claim 30 wherein the stripping treatment occurs at a temperature in the range of from about 260° C. to about 270° C.

32. The method of claim 17 wherein the inert gas is selected from the group consisting of nitrogen, carbon dioxide and steam.

33. The method of claim 32 wherein the inert gas is nitrogen.

34. An adhesive produced by the method of any of claims 17–33.

* * * * *

UNITED STATES PATENT AND TRADEMARK OFFICE
CERTIFICATE OF CORRECTION

PATENT NO. : 5,504,152
DATED : April 2, 1996
INVENTOR(S) : Robert W. Schluenz and Paul S. Douglas It is certified that error appears in the above-indentified patent and that said Letters Patent is hereby corrected as shown below:

Col.6, Claim 2. lines 31-32, change "dipropylene glycol triethylene glycol tripropylene glycol polyethylene glycol" to -- dipropylene glycol, triethylene glycol, tripropylene glycol, polyethylene glycol --

Column 5, line 12, change "heat uptime" to -- heat-up time --

Column 5, line 32, change "heatup" to -- heat-up --

Signed and Sealed this

Fifteenth Day of October, 1996

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,504,152
DATED : April 2, 1996
INVENTOR(S) : Robert W. Schluenz, et al.

It is certified that error appears in the above-indentified patent and that said Letters Patent is hereby corrected as shown below:

Column 7, claim 18, line 29, change "16" to --17--.

Signed and Sealed this

Third Day of December, 1996

Attest:

BRUCE LEHMAN

*Attesting Officer*  *Commissioner of Patents and Trademarks*